(12) United States Patent
Wilf

(10) Patent No.: US 6,496,824 B1
(45) Date of Patent: Dec. 17, 2002

(54) SESSION MANAGEMENT OVER A STATELESS PROTOCOL

(76) Inventor: Saar Wilf, 26 Hahanai Street, Jerusalem 96264 (IL)

(*) Notice: Subject to any disclaimer, the term of this patent is extended or adjusted under 35 U.S.C. 154(b) by 0 days.

(21) Appl. No.: 09/253,137

(22) Filed: Feb. 19, 1999

(51) Int. Cl.$^7$ .............................................. B06F 17/30
(52) U.S. Cl. ..................... 707/10; 707/1; 707/7; 707/5; 709/226; 709/227; 709/228; 713/170; 713/171; 713/201; 705/52; 705/77
(58) Field of Search .......................... 709/226, 227, 709/228, 201; 707/5, 1, 10, 7; 370/311, 351; 705/52, 77; 713/170, 171, 201

(56) References Cited

U.S. PATENT DOCUMENTS

| | | |
|---|---|---|
| 5,708,780 A | 1/1998 | Levergood et al. ......... 709/229 |
| 5,715,314 A | 2/1998 | Payne et al. .................. 705/78 |
| 5,727,129 A | 3/1998 | Barrett et al. |
| 5,742,762 A | 4/1998 | Scholl et al. |
| 5,774,670 A * | 6/1998 | Montulli ..................... 709/227 |
| 5,784,562 A * | 7/1998 | Diener ........................ 709/217 |
| 5,784,565 A | 7/1998 | Lewine |
| 5,815,709 A * | 9/1998 | Waldo et al. ............... 709/303 |
| 5,850,442 A * | 12/1998 | Muftic ......................... 380/21 |
| 5,918,014 A * | 6/1999 | Robinson ..................... 706/12 |
| 5,961,601 A * | 10/1999 | Iyengar ...................... 709/229 |
| 5,963,915 A * | 10/1999 | Kirsch ......................... 705/26 |
| 5,991,802 A * | 11/1999 | Allard et al. ............... 709/219 |
| 6,002,772 A * | 12/1999 | Saito ........................... 380/49 |
| 6,006,221 A * | 12/1999 | Liddy et al. .................. 707/5 |
| 6,006,222 A * | 12/1999 | Culliss .......................... 707/5 |
| 6,018,619 A * | 1/2000 | Allard et al. .......... 395/200.54 |
| 6,021,202 A * | 2/2000 | Anderson et al. ............. 380/25 |
| 6,021,439 A * | 2/2000 | Turek et al. ................. 709/224 |
| 6,026,388 A * | 2/2000 | Liddy et al. ................... 707/1 |
| 6,035,281 A * | 3/2000 | Crosskey et al. ............. 705/14 |
| 6,049,820 A * | 4/2000 | Murphy, Jr. et al. ........ 709/203 |
| 6,061,741 A * | 5/2000 | Murphy, Jr. et al. ........ 709/248 |

FOREIGN PATENT DOCUMENTS

| | | | |
|---|---|---|---|
| EP | 807891 | 11/1997 | ........... G06F/17/30 |
| EP | 812088 | 12/1997 | ............. G06F/9/44 |
| EP | 784279 | 6/1998 | ........... G06F/17/30 |

OTHER PUBLICATIONS

Bisdikian et al., "The use of priorities on token ring networks for multimedia traffic", IEEE, pp. 28–37, Nov. 1995.*

(List continued on next page.)

Primary Examiner—Jean M. Corrielus

(57) ABSTRACT

A method for session management over a stateless protocol the steps of comparing a first plurality of identifiers contained in a first request with a second plurality of identifiers contained in a second request, and associating the second request with the first request when the comparison is successful. The method may also include the step of calculating a total statistical significance for the plurality of identifiers. The step of associating is performed only when the total statistical significance is greater than a predetermined required significance level. A token for session management over a stateless protocol is formed by digitally hashing a plurality of identifiers contained in a request. The token may have a total significance calculated from a statistical significance associated with each of the plurality of identifiers.

2 Claims, 3 Drawing Sheets

OTHER PUBLICATIONS

Hadjiefthymiades et al., "State management in WWW Database Application", IEEE, pp. 442–448, Jan. 1998.*

Kawahsima et al., "Desgn and Implementation of distributed multimedia session manager for efficient multi–point applications" IEEE, pp. 107–119, Jan. 1999.*

Jacques Savoy, "A new probabilistic scheme for information retrieval in hypertext", pp. 106–135, Jan. 1995.*

Federal Information Processing Standards (FIPS) Publication 180, found at : on Aug. 19, 1999 14:13 http://www.itl.nist.gov/lab/fips/fips180.txt.

Request for Comments (RFC) 1321 found at : on Aug. 19, 1999 14:17 http://info.internet.isi.edu/in–notes/rfc/files/rfc1321.txt.

Request for Comments 1319 found at: on Aug. 19, 1999 15:02 http://info.internet.isi.edu/in–notes/rfc/files/rfc1319.txt.

Request for comments 1186 found on Aug. 25, 1999 10:40 at: http://info.internet.isi.edu/in–notes/rfc/files/rfc1320.txt.

* cited by examiner

SESSION MANAGEMENT OVER A STATELESS PROTOCOL

FIELD OF THE INVENTION

The present invention relates to session management of Internet communications.

BACKGROUND OF THE INVENTION

The Internet is a worldwide computer network consisting of many smaller networks. The computers on these networks, known as "hosts", communicate using a common protocol, for example, the Transmission Control Protocol/Internet Protocol (TCP/IP) networking protocol. Each host is identified by its Internet Protocol (IP) address.

The World Wide Web (the "Web") is a system of interconnected "pages", or documents, that are provided by software known as "servers" running on hosts. The Web pages are written in hypertext markup language (HTML) and are interconnected by hyperlinks. The request for and transfer of Web pages is made possible using the hypertext transfer protocol (HTTP), which runs over TCP/IP. The Web pages are provided to "client" computers that request them from the Web server. The HTTP request is sent by software known as a Web "browser" running on the client, and the browser then displays the Web page for the user who requested it.

A typical HTTP request includes the following information: the Uniform Resource Locator (URL) of the Web page to be accessed, a "User-Agent" header and might include also "Accept" and/or "Accept-Language" headers. The User-Agent header indicates the browser sending the request and the operating system of the computer where the browser is running in some browsers, the language of the operating system is also sent in the User-Agent header, while in others it is sent in the Accept-Language header. The Accept header contains the MIME types supported by the browser. The IP address of the client is part of the underlying IP packet. If the client is accessing the Internet through a proxy server, then it is the proxy's IP address which is sent as part of the underlying IP packet. Some proxies report the client's IP address in an additional HTTP header dedicated for that purpose, for example the "Forwarded-For" header or "Client-IP" header.

Many applications running on HTTP servers need to maintain state, meaning that they need to save information about the client from one request to another. The server maintains a session for each client that makes requests, so that the server will send the client Web pages based upon the information in previous requests from the same client. One example is a newspaper Web site that charges users for each article that the user reads. The newspaper application needs to remember which articles the user has previously read in order not to charge the user more than once for a particular article. Another example is a Web shopping site having a shopping cart application for storing the goods that the user wishes to buy. The shopping cart application needs to ensure that, as the user browses through the site's Web pages, the shopping cart retains the goods the user has placed there.

It is well known that HTTP is a stateless protocol, which means that an HTTP server handles each request from a client independently from all other requests from the same client. Therefore, a number to techniques have been developed in order to add state to the HTTP protocol. Examples are "cookies", altering the URL to include encoded session data. and using the Basic Authentication mechanism described in the Request for Comments (RFC) 1945, chapter 11.1, which can be found on the Internet at info.Internet.isi.edu/in-notes/rfc/files/rfc1945.txt.

A cookie is a message given to a browser by a Web set. The browser stores tho cookie and then sends it back to the server each time the browser requests a page from the server. U.S. Pat. No. 5,774,670 to Montulli describes a method and apparatus for transferring cookies between an HTTP server and a client. Unfortunately, some browsers do not support the use or cookies. Other browsers can be configured by the user not to accept cookies. Several users may use the same browser, for example parents who access the Internet Via a work Internet Service Provider (ISP) account while the children access the Internet via a family ISP account, and some applications might want to distinguish between users in such cases. Furthermore, cookies can be copied from one browser to another with little difficulty, thus compromising security.

U.S. Pat. No. 5,708,780 to Levergood et al. describes a system for maintaining an HTTP session by altering the URL to include a session identifier. This session identifier may easily be lost when the user clicks on an absolute link. It also exposes internal binary data to the user in an unaesthetic way, and may easily be transferred from one user to another.

U.S. Pat. No. 5,784,565 to Lewine describes a method for creating a virtual HTTP session using a username and password. European Patent Application 812088 to Iyengar describes a method for preserving state by modifying the links in an HTMI document. European Patent Applications 784279 and 807891 to Levine and Carter describe a stateless shopping cart for the Internet. The list of items already selected by the user is sent to the browser by the HTTP server with each HTTP response, and returned to the HTTP server by the browser with each HTTP request. The HTTP server does not have to retain this list from one HTTP request to the next.

SUMMARY OF THE INVENTION

There is therefore provided in accordance with a preferred embodiment of the present invention a method for session management over a stateless protocol. The method includes the steps of comparing a first plurality of identifiers contained in a first request with a second plurality of identifiers contained in a second request, and associating the second request with the first request when the comparison is successful.

Moreover, in accordance with a preferred embodiment of the present invention, the method further includes the step of calculating a total statistical significance for the plurality of identifiers. The step of associating is performed only when the total statistical significance is greater than a predetermined required significance level.

There is also provided in accordance with a further preferred embodiment of the present invention a method for session management over a stateless protocol The method includes the steps of receiving a request containing a plurality of identifiers and generating a hash of at least one of the plurality of identifiers. If the generated hash is incompatible with previously generated hashes, information is associated with the generated hash, and a response is sent based upon information associated with the generated hash. If the generated hash is compatible with a previously generated hash, a response is sent based upon information previously associated with the previously generated hash.

Moreover, in accordance with a preferred embodiment of the present invention, the method further includes the steps of associating a statistical significance value with each of the at least one identifiers, and calculating a total significance for the hash from all of the associated values. If the generated hash is incompatible with previously generated hashes, a user identification is obtained, and the user identification is associated with the generated hash. The steps of sending a response are performed only when the total statistical significance is greater than a predetermined required significance level, and the response is also based upon the user identification.

There is also provided in accordance with another preferred embodiment of the present invention a token for session management over a stateless protocol, the token formed by digitally hashing a plurality of identifiers contained in a request.

Moreover, in accordance with a preferred embodiment of the present invention, the token has a total significance calculated from a statistical significance associated with each of the plurality of identifiers.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Applicants have realized that a digital hash of a collection of identifiers available to an HTTP server can be used as a "fingerprint" of the user for the purpose of session maintenance. Furthermore, the total statistical significance of the fingerprint can be estimated.

Statistical significance arises when examining one hypothesis in view of another: The probability of accepting the first hypothesis, in light of some collected data, when in fact the second is correct. The lower the probability, the more statistically significant are the findings considered. In our case, the first hypothesis is that two HTTP requests are from the same user, and the second hypothesis is that the requests are from different users.

A digital hash, also known as a "message digest", is a token generated from source digital information according to a mathematical function. The function is designed so that a small change in the source information produces is a big change in the resulting digital hash. Hashing algorithms are "one-way" in that the source digital information cannot be recreated from the hash. Moreover, the probability that different sources will produce the same hash is small. The hashing algorithms MD2 (message digest 2), SHA (secure hashing algorithm), SHA1 and MDS are well known in the art. SHA and SHA1 are described in the Federal Information Processing Standards (FIPS) publication 180, found on the Internet at .itl. nist. gov/lab/fips/fips 180.txt. MD5 is described in the Request for Comments (RFC) 1321, found on the Internet at info.internet.isi.edu/in-notes/rfc/files/rfc1321.txt. MD2 is described in RFC 1319, found on the Internet at info. internet.isi.edu/in-notes/rfc/files/rfc1319.txt, and MD4 is described in RFC 1186, found on the Internet at info.internet.isi.edu/in-notes/rfc/files/rfc1186.txt.

Figure 1:
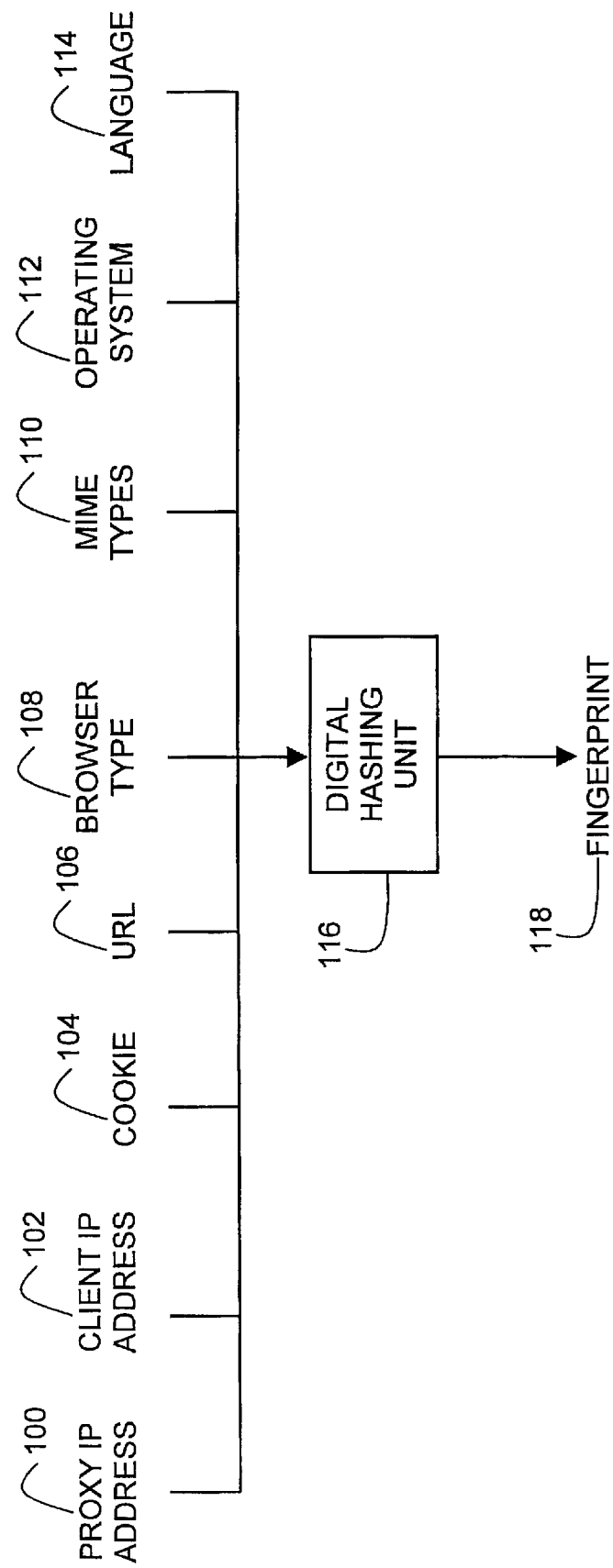
FIG. 1 is a schematic illustration of a digital hash of a collection of identifiers, according to a preferred embodiment of the present invention.

Reference is now made to FIG. 1, which is a schematic illustration of a diqital hash of a collection of identifiers, according to a preferred embodiment of the present invention. The collection of identifiers includes the proxy IP address 100, the client IP address 102, the cookie 104, a session identifier 106 encoded in an URL, the browser type 108, MIMF types as reported by the browser 110, the operating system 112, and the language 114 of the operating system, as reported in the User-Agent and other HTTP headers. The server may choose to use all or part of the identifiers.

According to a preferred embodiment of the present invention, each of the identifiers 100–114 can be expressed as a string of characters. For example, the proxy IP address 100 might be "163.17.39.8", the client IP address 12 might be "193.4.23.125", the cookie 104 might be "FD81EDD2DA7396EC 072BA143004CF27", the session identifier 106 might be "FaGojq93lbJi3110" as encoded in the URL server.com/FaCojq93lbJi3110", the browser type 108 might be "Mozilla/3.01", the operating system 112 might be "Windows95", and the language 114 might be "English". According to a preferred embodiment of the present invention, the strings are concatenated into a single string, for example "163.17.39.8193.4.23.125FD81EDD 2DA7396E2C072BA143004CF27 server.com/FaGojq93lbJi3110/Mozilla/3.01Windows95English", and the single string is hashed using digital hashing unit 116, using for example MD5, MD2, SHA, SHA1, or any other suitable digital hashing function. The result is a single fingerprint 118 which can be used by the HTTP server to identify the session.

It will be appreciated that the process of hashing the concatenated string is done only for simplification. The concatenated string itself could have been used as a fingerprint. Compressing it into a short string of fixed length allows for faster and easier development.

Figure 2:
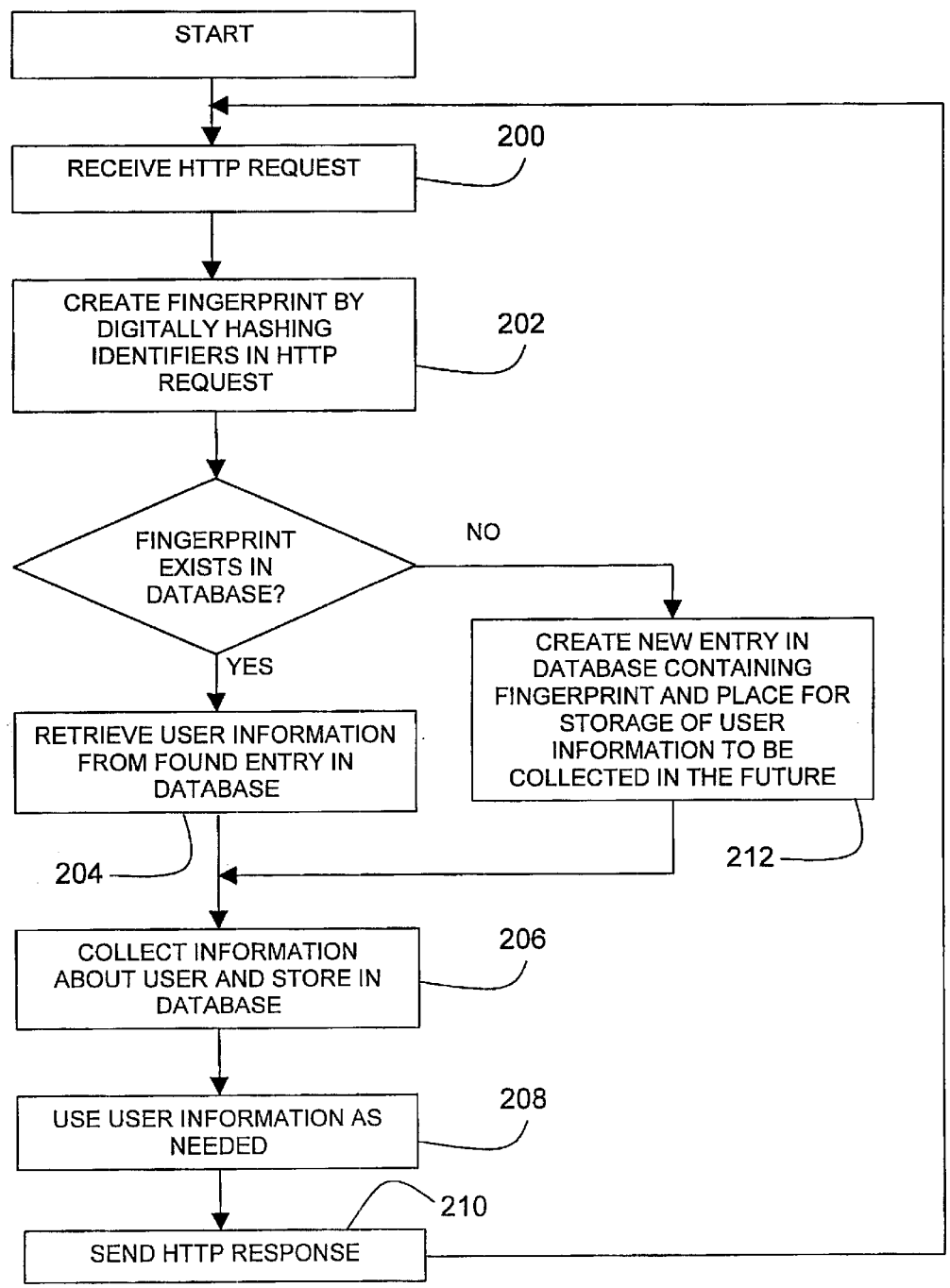
FIG. 2 is a schematic flowchart Illustration of a method for HTTP. session management, according to a preferred embodiment of the present invention.

A method for HTTP session management using fingerprints, in accordance with a preferred embodiment of the present invention, is shown in FIG. 2, to which reference is now made. This embodiment reflects a case where the user does not give information, but rather the server collects it with each HTTP request, as in shopping cart applications or applications requiring knowledge of previous pages visited. An HTTP server receives (step 200) an IITTP request and creates (step 202) a fingerprint by digitally hashing from the identifiers contained in the HTTP request. If the fingerprint exists in a database acessible to the server, then the server retrieves (step 204) user information stored in the database along with the finger print. The server collects (step 206) additional user information and stores it in the database along with the fingerprint. The server then uses (step 208) the user information as needed, and sends (step 210) an HTTP response to the HTTP request. Then the server receives (step 200) the next HTTP request. If the fingerprint does not exist in the database, then the server creates (step 212) a new entry in the database containing the fingerprint and place for storing user information to be collected in the future. The server collects (step 206) user information and stores it in the database along with the fingerprint The server then uses (step 208) the user information as needed, and sends (step 210) an HTTP reponse to the HTTP request.

According to another aspect of the present invention, the server estimates the total statistical significance of the fingerprint when receiving the HTTP request. Each of the identifiers in the collection is associated with a statistical significance. In accordance with a preferred embodiment of tho present invention, a number describing the probability that another user will have the same identifier is given. For example, the statistical significance of the user's IP address could be estimated at around 0.00000001, which is the chance that another user will use the same IP address (for example, if this IP address is dynamically assigned by an ISP). Each browser type is assigned a statistical significance. Preliminary research can be done to estimate the popularity of each browser type, or the server can calculate this over time by recording each HTTP request into an historical statistical database, or both.

Some of the identifiers are correlated. For example, since Internet Explorer does not run on Unix, the probability that a user uses a Netscape browser is higher if the user is using the Unix operating system than if the user is using a Windows-based operating system. As another example, the client IP address and the proxy IP address are correlated, since proxy servers usually serve a specific sub-network. Since sub-networks are characterized by a range of IP addresses, these IP addresses are very likely to be associated with the sub-network's proxy. Thus, the proxy IP address loses all statistical significance once the client IP address is obtained.

The total statistical significance of the fingerprint is a number which takes into account the statistical significance of all of the identifiers, as well as the correlations. According to a preferred embodiment of the present invention, the total statistical significance of the fingerprint is the product of multiplying the statistical significance of each identifier. If two or more identifiers have been found, by prior research, to be somewhat correlated, meaning they tend to appear together, their statistical significance is reduced in order to compensate for the correlation. For example, if two unrelated identifiers each have a statistical significance of 0.5, the total statistical significance is 0.26. If the two identifiers are correlated, the total statistical significance can be anywhere between 0.25 and 0.5, depending upon the strength of the correlation.

It will be appreciated that the larger the collection of identifiers, the stronger the identification provided by the fingerprint produced by digitally hashing the identifiers.

According to a further aspect of the present invention, a required significance level is assigned to an application running on the HTTP server. For example, an application designer may decide that fingerprints must have a required significance level of 1:100,000, otherwise the user must identify himself to the server by some other mechanism, such as a password. A required significance level or 1:100,000 means that the application designer is willing to mistake user identities at most 1 in 100,000 times. For example, a newspaper site is willing to give articles to customers that didn't buy them 1 in 100,000 times. This is a very important feature of the present invention, as it allows the application designer to limit the error rate of the application in a quantifiable way.

Figure 3:
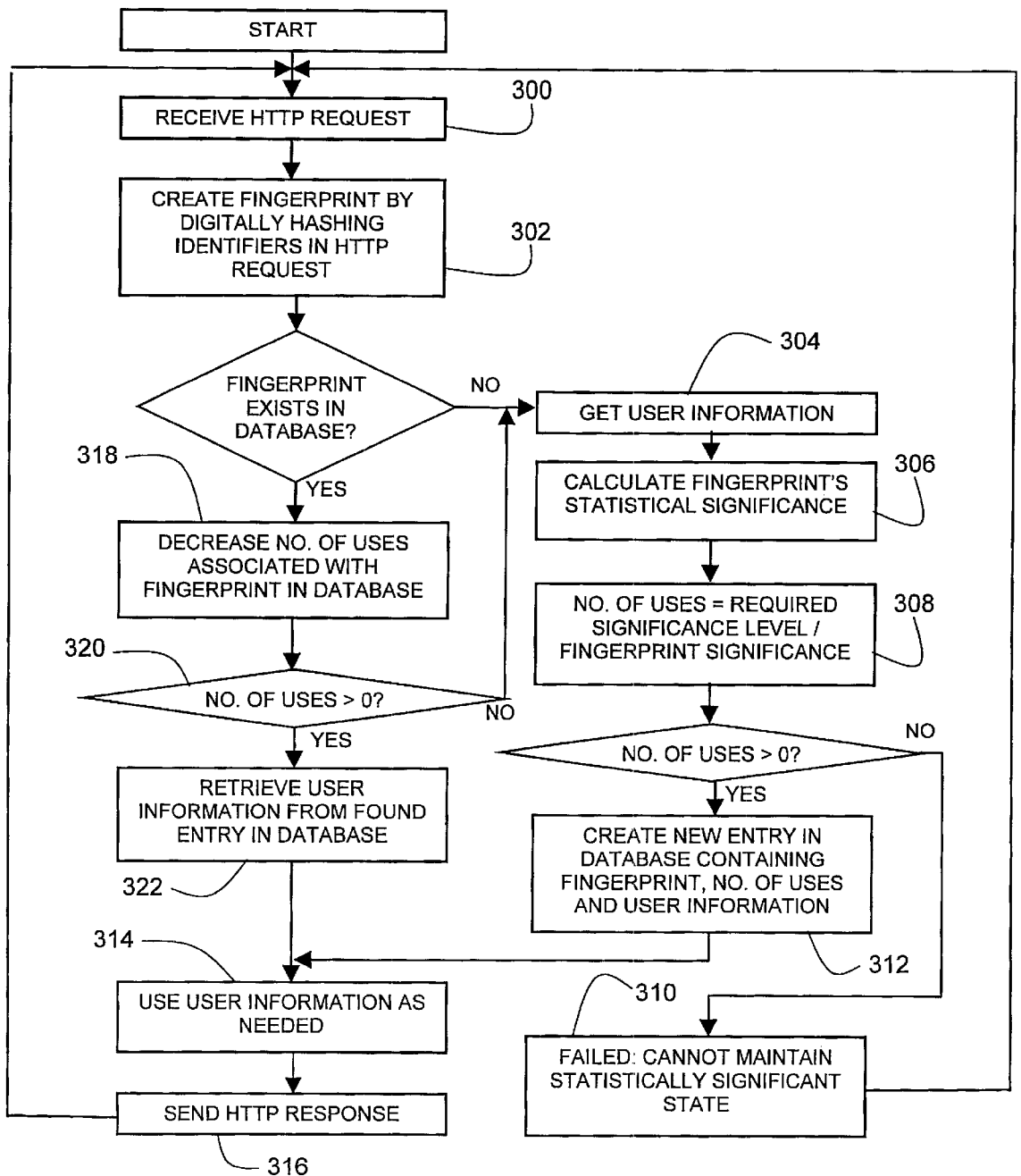
FIG. 3 is a schematic flowchart illustration of a method for HTTP session management, according to a further preferred embodiment of the present invention.

A method for HTTP session management using fingerprints and statistical significance, in accordance with a further preferred embodiment of the present invention, is shown in FIG. 3. to which reference is now made. An HTTP server receives (step 300) an HTTP request, and creates (step 302) a fingerprint by digitally hashing from the identifiers contained in the HTTP request. If the fingerprint does not exist in a database accessible to the server, then the server gets (step 304) user information, such as a username and password, or a credit card number, from the user. The server calculates (step 308) the total statistical significance of the fingerprint, and determines (step 308) the number of uses associated with the fingerprint. The number of uses is the integer resulting from rounding down the quotient of a predetermined required significance level by the fingerprints total statistical significance. For example, if the calculated total statistical significance was found to be 1:10,000,000, a server requiring a significance level of 1:100,000 will associate this fingerprint with the same session 100 times without requesting the user information again. When dealing with small numbers (as is the case here), It can be proven mathematically that this division provides a very good estimate of the number of times the fingerprint can be used before the probability of mistaking identities exceeds the required significance level.

If the number of uses is not greater than 0. the server falls (step 310) to maintain a statistically significant state, and the server receives (step 300) the next HTTP request. If the number of uses is greater than 0, the server then creates (step 312) a new entry in the database containing the fingerprint, the number of uses determined in step 308. and the user information obtained in step 304. The server uses (step 314) the user information as needed, and sends (step 316) an HTTP response to the HTTP request. Then the server receives (step 300) the next HTTP request. If the fingerprint exists in the database, then the server decreases by 1 (step 318) the number of uses associated with the fingerprint in the database, and then checks (step 320) whether the decreased number of uses is greater than 0. If the decreased number of uses is not greater than 0, then the server continues from step 304. If the decreased number of uses is greater than 0, then the server retrieves (step 322) user information stored in the database along with the fingerprint, uses (step 314) the user information as needed, and sends (step 316) an HTTP response to the HTTP request.

When estimating the statistical significance of each identifier, two cases should be considered: that of normal users, and that of malevolent users (hackers). For example, a certain IP address is assigned to one host on the Internet at a certain time, making it a very significant identifier. However, a hacker might knowingly spoof this IP address, thus deceiving the system. Thus the statistical significance of the IP address identifier is different for normal users and for hackers. As a result, each fingerprint has two different total is statistical significance numbers—one for normal users and one for hackers. A server which is more likely to be attacked by hackers might choose to give higher priority to the hacker total statistical significance than to the normal total statistical significance. This will cause the server to require other user identification methods more often.

It will be appreciated by persons skilled in the art that the present invention is not limited by what has been particularly shown and described hereinabove. Rather the scope of the invention is defined by the claims that follow.

What is claimed is:

1. A method for session management over a stateless protocol, the is method comprising the steps of:
    receiving a request containing a plurality of identifiers;
    generating a hash of at least one of said plurality of identifiers;

if said generated hash is incompatible with previously generated hashes:
associating information with said generated hash; and
sending a response based upon information associated with said generated hash; and
if said generated hash is compatible with a previously generated hash, sending a reponse based upon information previously associated with said previously generated hash.

2. A method according to claim 1, the method further comprising the steps of:
associating a statistical significance value with each of said at least one identifiers;
calculating a total significance for said hash from all of said associated values; and
if said generated hash is incompatible with previously generated hashes:
obtaining a user identification;
associating-said user identification with said generated hash;
wherein said steps of sending a response are performed only when said total statistical significance is greater than a predetermined required significance level, and
wherein said response is also based upon said user identification.

* * * * *